United States Patent [19]

Hunt

[11] 3,955,127
[45] May 4, 1976

[54] METHOD OF MANUFACTURING ELECTRICAL CAPACITORS AND THE ELECTRICAL CAPACITORS FORMED BY THE METHOD

[75] Inventor: Delbert E. Hunt, Ogallala, Nebr.
[73] Assignee: TRW Inc., Ogallala, Nebr.
[22] Filed: Apr. 25, 1975
[21] Appl. No.: 571,578

[52] U.S. Cl. .............................. 317/258; 29/25.42; 242/56.1; 317/260
[51] Int. Cl.² ......................................... H01G 4/14
[58] Field of Search ........... 29/25.42; 317/258, 260; 242/56.1

[56] References Cited
UNITED STATES PATENTS
3,221,226  11/1965  Kennedy ........................... 317/258

*Primary Examiner*—E. A. Goldberg
*Attorney, Agent, or Firm*—Poms, Smith, Lande & Glenny

[57] ABSTRACT

In the method of manufacturing capacitors, elongated thermpolastic dielectric film having a conductive coating associated therewith is wound on a mandrel. Thereafter, heat is applied to the winding to shrink the thermoplastic material to tighten it. This method had been improved by depositing moisture or volatile material to the film during winding thereof to act as a lubricant between the successive layers of the film. Preferably, the electric component is heated at atmospheric pressure so that the lubricant will evaporate slowly to remain within the winding during heat shrinking to provide lubrication between the successive layers of the film. Thereafter, the components are heated in a vacuum to evaporate all remaining lubricant. Preferably the heat shrinking takes place immediately after the lubricant is deposited on the film before it has evaporated from the winding and before it has corroded the conductive coating.

7 Claims, 2 Drawing Figures

U.S. Patent May 4, 1976 3,955,127

METHOD OF MANUFACTURING ELECTRICAL CAPACITORS AND THE ELECTRICAL CAPACITORS FORMED BY THE METHOD

BACKGROUND OF THE INVENTION

In general, the present invention concerns improvements in the manufacturing of capacitors which are formed by plural windings of metalized thermoplastic sheets or elongated films. These devices are often referred to as metalized thermoplastic capacitors.

The method of manufacturing such capacitors is generally set forth in the present inventor's copending application Ser. No. 487,249 filed July 10, 1974. Briefly, metalized thermoplastic capacitors are formed by first applying a coating of good conductive material or binding a sheet of conductive material to one surface of each of two elongated stretches of thermoplastic sheet or film material. An uncoated margin is provided on opposite edges of each sheet so that the dielectric film insulates the conductive coating from direct contact when the sheets are wound together in bifilar configuration. Each axial end of the wound body has the conductive surface of one sheet exposed, and electrodes are attached to the exposed conductive surfaces by means of a molten metal spray. The method also applies to other types of capacitors, and the specification uses the capacitor of Ser. No. 487,249, supra, as an example.

In the old method, the two layers of thermoplastic dielectric are wound on a mandrel to a given degree of tightness. The wound part is then subjected to heat treatment, generally employing a vacuum, to shrink the thermoplastic and tighten the winding. The shrinkage imparts physical rigidity as well as capacitive stability to the wound part.

It is well known that moisture or other foreign material effects the electrical properties of a capacitor. Heretofore, every effort has been made to eliminate the foreign material from the capacitor body at an early stage in the manufacturing process. For example, see Cox, U. S. Pat. Re 27,533.

It is advantageous to obtain a very tight winding from the physical stability standpoint of the capacitor, and the tightness of the winding also adds capacitance stability to the capacitor. However, tight winding and heat shrinking to obtain an even tighter winding may cause physical problems with the material of the capacitor. During both the winding and heat shrinking, successive layers of material abrade each other which may cause cracking of the capacitor, splitting of an internal layer, or removal from an area of the conductive coating. Any of these defects yield undesirable physical and electrical properties in the capacitor.

It is also an object of the present invention to increase the insulation resistance of the capacitor. A higher insulation resistance causes a capacitor to be closer to the ideal capacitor and improves the RC response of a circuit utilizing it.

Therefore, it is an object of the present invention to provide a method in which the capacitor is tightly wound and heat shrunk without adverse affects to the material and the capacitor. A further object involves accomplishing the previous objective without adversely effecting the electrical properties of the capacitor.

SUMMARY OF THE INVENTION

Instead of eliminating moisture from the capacitor body in an early stage in the manufacturing process, excess moisture or other volatile material is added to the film during winding thereof to act as a lubricant between successive layers of film. Water may be used as the preferred moisture material, but other volatile materials may be used as the lubricant. The lubricant conforms to criteria set forth hereinafter. The excess lubricant is subsequently removed from the wound capacitor during the heat shrinking process, but heat shrinking which had heretofore been done in a vacuum chamber now takes place at atmospheric pressure so that the lubricant evaporates slowly to remain within the winding during heat shrinking for lubrication. Thereafter, the capacitor may be heated in a vacuum to evaporate all remaining lubricant. The heat shrinking is done immediately after the lubricant is deposited on the film and before it has evaporated from the windings and before it has begun corroding the conductive coating.

the lubricant should conform to the following criteria. Generally, the lubricant will be a liquid at the temperature at which is applied. Because one of the preferred methods of applying the lubricant is through atomizing, the film may have to be cooled so that the lubricant condenses as a liquid. It is possible, of course, to condense the lubricant as a solid if the temperature of the film is held below the freezing point of the lubricant, but generally, it is advantageous to apply the lubricant as a liquid because solid particles of frozen lubricant may scratch the film and coating.

The lubricant should have a low boiling point so that it can be vaporized from the windings at temperatures well below that which will damage the film. The lubricant should also be non-corrosive to the film and conductive coating.

Distilled water is a preferred lubricant because of its low cost and ease of application. It is easily vaporized especially in a vacuum in order to remove all traces of it after heat shrinking. Other materials which may be used include lower alkyl alcohols, certain freons, and other volatile liquids.

DETAILED DESCRIPTION OF THE PREFERRED EMBODIMENT

Figure 1:
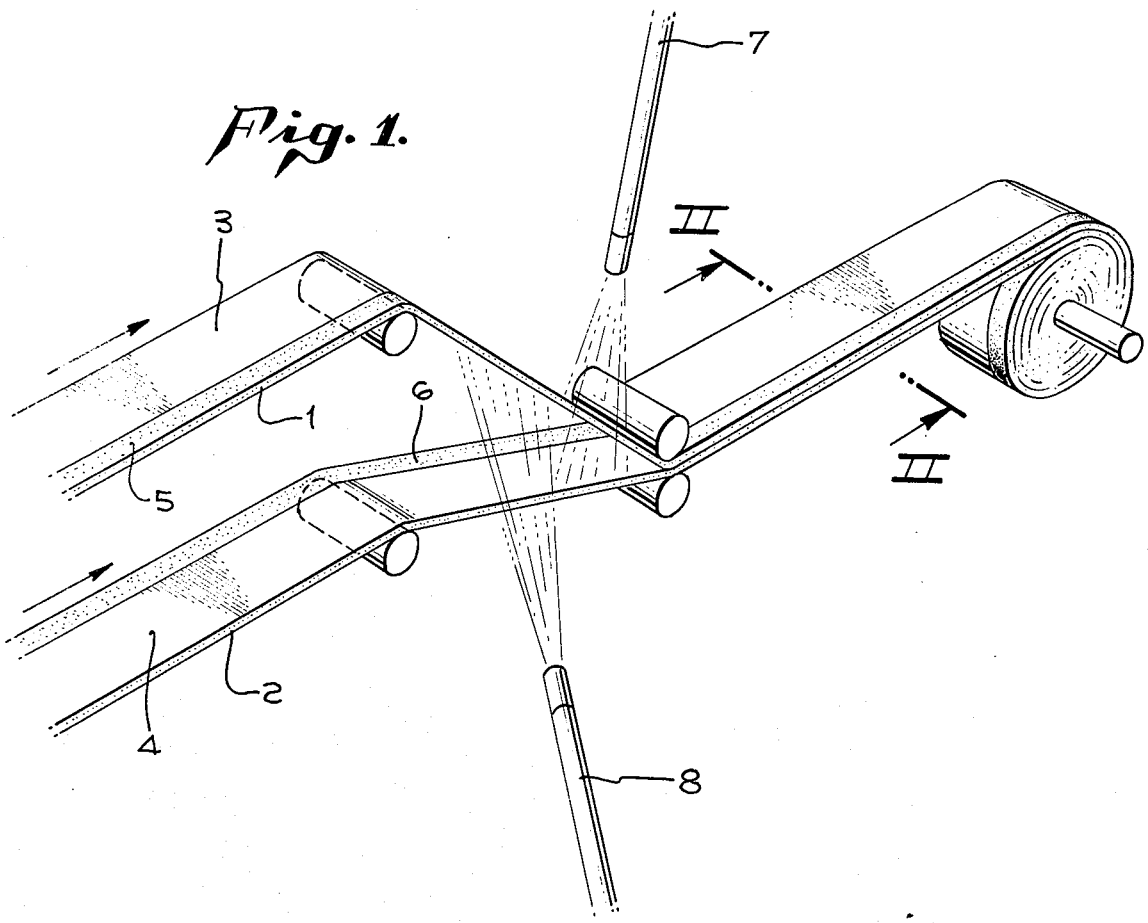
FIG. 1 is a schematic of a machine utilizing the method of the present invention in winding the capacitor.

The method of manufacturing capacitors includes winding elongated thermoplastic dielectric film having a conductive coating associated therewith. This procedure is illustrated in FIG. 1 wherein thermoplastic films 1 and 2 having conductive coatings 3 and 4 associated therewith. The conductive coating on each sheet of dielectric material only extends to one edge of the thermoplastic sheet, and the coatings on the respective films extend to opposite edges leaving opposite marginal portions 5 and 6 on the dielectric material.

Figure 2:
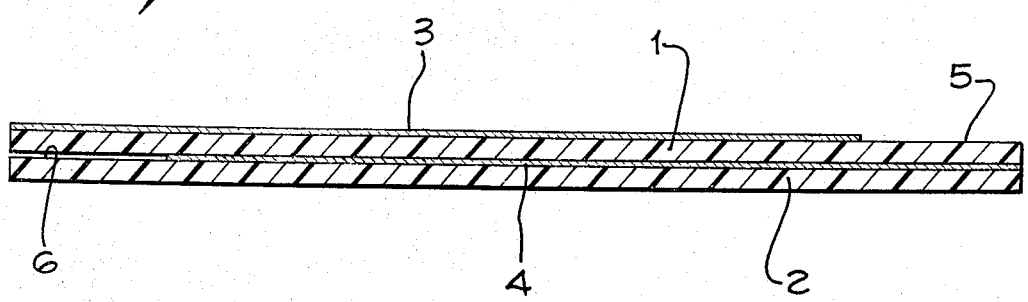
FIG. 2 is a sectional view of the material being wound into the capacitor and is taken along the plane II-II in FIG. 1.

Referring now to FIG. 2, the sheets of dielectric material are positioned one above the other. The marginal portion 5 is on the right side of the combined layers and the marginal portion 6 is on the left side thereof. After the parts are wound, and after other operations not important to the present invention are accomplished, electrodes are attached on either side so that an electrode on the left side of the material contacts the conductive surface 3 of all successive windings but because of the marginal portion 6, such an electrode does not contact the conductive surface 4. Likewise, a right hand electrode would contact conductive surface 4 but would not contact conductive surface 3 because of marginal portion 5.

In the exemplary embodiment, the conductive surface on the dielectric material is a coating applied to the dielectric material. However, it should be recognized that a film of conductive material could be used and be wound with the dielectric material. The present invention would work well with such an arrangement.

After successive layers of the material are wound about the mandrel, heat is applied to the winding to shrink the thermoplastic dielectric material to tighten the winding. This is done in order to insure that the capacitor will have the proper physical and electrical characteristics.

As hereinbefore stated, it was previously thought advantageous to remove all moisture and other material at an early stage of the preparation of the windings. However, the present invention concerns the improvement in the method of depositing moisture or other volatile material to the dielectric film during winding to act as a lubricant between successive layers of film. The lubricant may be applied utilizing any known moisture application or volatile material application techniques. In the exemplary embodiment, water is used as the moisture material, and spray nozzles 7 and 8 spray a fine mist of moisture onto all surfaces of the dielectric film and coating thereon. There are other methods of applying moisture to the film. For example, the dielectric film supply roll could be chilled and while maintaining the film at the low temperature, the film could pass through a humidity chamber between the supply roll and the winding station. Moisture in the humidity station would condense on the cold film. A wick arrangement could also be used. The invention is predicated on the discovery that the addition of excess moisture or other volatile material at an early stage in the process does not effect the electrical properties of the capacitor and improves the physical structure of the capacitor by providing lubrication between successive layers in the winding.

As the sheets of elongated material are wound into a circle, there is sliding between the inside layers and the outside layers due to different radii of the respective windings. The friction can cause uneven stress to the dielectric material and may result in cracking thereof. Physical stresses on the dielectric material can cause changes in the electrical properties of the capacitor. Moreover, the friction may effect the conductive surfaces adversely. The frictional problems are greatly enhanced during heat shrinking when the winding is compressed greatly. These problems are intensified because the dielectric material is under some stress due to the temperature required to heat shrink it.

The moisture or other material added between the windings acts as lubricant and allows easier sliding of the sheets of dielectric material relative to each other. Because the majority of strains occur during the heat shrinking process, it is advantageous to maintain lubrication during heat shrinking. Previous methods of winding capacitors utilized vacuums with the heat shrinking in order to evaporate any undesirable moisture. However, by heat shrinking at atmospheric pressure, the moisture or other material will evaporate slowly and act as a lubricant during heat shrinking. Preferably, a temperature of between 100° C to 160° C is used. This temperature should be applied rapidly so that the ultimate amount of shrinkage of the dielectric material is obtained before the applied lubricant is driven off. It is desirable that all lubricant evaporate from the windings at the end of the heat shrinking operation. In order to insure that, the additional step of heating the capacitor in a vacuum after completion of the heat shrinking may be provided to evaporate any traces of lubricant. The final heat treatment preferably takes place in a vacuum at 100° C–160° C for 16 to 36 hours.

The lubricant should be added during the winding process, and heat shrinking should take place immediately after the winding process is completed. If the heat shrinking is delayed, the moisture or other material will evaporate from the windings, and its lubricating effect will be lost. Moreover, because lubrication left on the conductive coating may corrode the coating, it is also advantageous to complete the heat shrinking and the evaporation of the lubricant as early as possible after applying it.

The following are examples of tests utilizing the novel method of the present invention:

EXAMPLE 1

Metallized polyester parts were wound on an automatic winder at two different winding tension settings. At each tension setting, parts were wound in the normal manner (control) and with moisture (water) sprayed into the winding by means of a perfume atomizer. All parts are 1.0mfd of 25 gauge metallized polyester. 20 parts each group.

| Winding Tension | Condition | 300 Volt Insulation Resistance, 25°C After 1 Minute Electrification | |
|---|---|---|---|
| | | Range | Average |
| 75 grams | Control | 2800 to 53000 Megohms | 6800 Megohms |
| 75 grams | Moisture | 7500 to 62000 Megohms | 35000 Megohms |
| 110 grams | Control | 430 to 2600 Megohms | 1700 Megohms |
| 110 grams | Moisture | 2300 to 55000 Megohms | 11500 Megohms |

EXAMPLE 2

Three groups of winding (0.22, 0.39, and 1.00 microfarad) were wound as control parts. The supply rolls of metallized polypropylene for these parts were then chilled at −55°C for 2 hours. The material was then remounted on the winding machine with the material passing through a steam chamber during winding. The control groups and three groups of parts wound with moisture were than submitted to standard production processes, with the first process being a heat treatment in an oven at 110°C for 16 hours.

| Capacitance In Mfd. | Treatment | Insulation Resistance at 100°C 200 VDC, 2 Minute Electrification | |
|---|---|---|---|
| | | Range | Average |
| .22 | Control | 17,000 to 45,000 Meg. | 27,500 Meg. |
| .22 | Wound with moisture | 4,100 to 110,000 Meg. | 52,000 Meg. |
| .39 | Control | 4,500 to 19,000 Meg. | 14,600 Meg. |
| .39 | Wound with moisture | 16,000 to 67,000 Meg. | 34,000 Meg. |
| 1.00 | Control | 3,300 to 4,800 Meg. | 4,200 Meg. |
| 1.00 | Wound with moisture | 5,200 to 15,000 Meg. | 10,800 Meg. |

It can be seen, therefore, that in both examples, the capacitors which were wound in accordance with the teaching of the present invention had much higher insulation resistances, and were closer to an ideal capacitor.

It will be understood that various modifications and changes may be made in the configuration described above which may come within the spirit of this invention and all such changes and modifications coming within the scope of the appended claims are embraced thereby.

I claim:

1. In a method of manufacturing capacitors including winding elongated thermoplastic dielectric film having a conductive coating associated therewith and then applying heat to the winding to shrink the thermoplastic material to tighten the winding, the improvement in the method comprising:
    depositing volatile liquid on said film during winding thereof to act as a lubricant between successive layers of said film, said liquid having the following properties:
    a. a boiling point below the temperature at which said film or said coating will be damaged;
    b. lack of a residue after evaporation; and
    c. non-corrosiveness to the film and coating.

2. The improvement of claim 1 further comprising: heating the wound capacitor at atmospheric pressure so that the volatile liquid evaporates slowly to remain within the winding and act as a lubricant during heat shrinking.

3. The improvement of claim 2 further comprising: heating said capacitor in a vacuum after completion of heat shrinking to evaporate all remaining volatile liquid.

4. The improvement of claim 1 further comprising: heat shrinking said capacitor immediately after the volatile liquid is deposited on the film before the volatile liquid has evaporated from the windings and before the volatile liquid corroded the conductive coating.

5. The improvement of claim 1 wherein the volatile liquid is distilled water.

6. The improvement of claim 1 wherein said volatile liquid depositing step comprises:
    chilling said dielectric film and then passing said film through vapor of said volatile liquid whereby said vapor condenses on said film.

7. The capacitor produced by the process of winding elongated thermoplastic dielectric film having a conductive coating associated therewith, depositing a volatile liquid to said film during winding thereof to act as a lubricant between successive layers of the film, and applying heat to the winding to shrink the thermoplastic material to tighten the winding and evaporate the volatile liquid.

* * * * *